United States Patent
Zhang et al.

(10) Patent No.: US 9,774,494 B2
(45) Date of Patent: Sep. 26, 2017

(54) METHOD, NODE, AND SYSTEM FOR DETECTING PERFORMANCE OF LAYER 3 VIRTUAL PRIVATE NETWORK

(71) Applicant: HUAWEI TECHNOLOGIES CO., LTD., Shenzhen, Guangdong (CN)

(72) Inventors: Li Zhang, Beijing (CN); Zhenbin Li, Beijing (CN); Yuanbin Yin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 14/581,009

(22) Filed: Dec. 23, 2014

(65) Prior Publication Data

US 2015/0109938 A1 Apr. 23, 2015

Related U.S. Application Data

(63) Continuation of application No. PCT/CN2013/077982, filed on Jun. 26, 2013.

(30) Foreign Application Priority Data

Jun. 30, 2012 (CN) .......................... 2012 1 0223023

(51) Int. Cl.
*H04L 12/24* (2006.01)
*H04L 12/26* (2006.01)

(52) U.S. Cl.
CPC .......... *H04L 41/08* (2013.01); *H04L 41/0604* (2013.01); *H04L 43/10* (2013.01)

(58) Field of Classification Search
CPC ........................... H04L 41/06–41/0604; H04L 41/0654–41/0659;
(Continued)

(56) References Cited

U.S. PATENT DOCUMENTS

2007/0133502 A1 6/2007 Osswald
2009/0168663 A1 7/2009 Friskney et al.
(Continued)

FOREIGN PATENT DOCUMENTS

CN 1848757 10/2006
CN 101355441 1/2009
(Continued)

OTHER PUBLICATIONS

Extended European Search Report dated Apr. 21, 2015 in corresponding European Patent Application No. 13809180.6.
(Continued)

*Primary Examiner* — Eric Myers
(74) *Attorney, Agent, or Firm* — Fish & Richardson P.C.

(57) ABSTRACT

Embodiments of the present invention disclose a method, apparatus, and system for detecting performance of a layer 3 virtual private network. A first node creates an OAM instance according to OAM configuration information set by a user, and sends the OAM configuration information to a second nodet; the second node creates an OAM instance according to the OAM configuration information; and the first node performs OAM detection by sending an OAM packet to the second node and/or receiving an OAM packet from the second node, where the sending and/or receiving is implemented by using the OAM instance of the first node. According to the present invention, not only an OAM configuration procedure is simplified and manpower is saved, but also consistency of OAM configuration at two ends can be ensured. In addition, a configuration delay in this dynamic configuration manner may be ignored.

4 Claims, 6 Drawing Sheets

(58) Field of Classification Search
CPC ........ H04L 41/0672–41/0677; H04L 41/0681; H04L 41/0695; H04L 41/08–41/0806; H04L 41/0813–41/0816; H04L 41/0846; H04L 41/0869; H04L 43/10
See application file for complete search history.

(56) References Cited

U.S. PATENT DOCUMENTS

| 2010/0118708 A1 | 5/2010 | Long et al. | |
| 2011/0222413 A1* | 9/2011 | Shukla | H04L 43/0811 370/241.1 |

FOREIGN PATENT DOCUMENTS

| CN | 101471813 | 7/2009 |
| CN | 102299815 | 12/2011 |
| CN | 102868569 | 1/2013 |
| WO | 2009/049292 A1 | 4/2009 |
| WO | 2011/047583 A1 | 4/2011 |

OTHER PUBLICATIONS

Chen, "Route Refresh Capability for BGP-4", Network Working Group, Redback Networks, Sep. 2000, pp. 1-4.
Rekhter et al., "A Border Gateway Protocol 4 (BGP-4)", Network Working Group, Jan. 2006, pp. 1-104.
Rosen et al., "BGP/MPLS IP Virtual Private Networks (VPNs)", Network Working Group, Feb. 2006, pp. 1-47.
Bates et al., "Multiprotocol Extensions for BGP-4", Network Working Group, Jan. 2007, pp. 1-12.
Bellagamba et al., "Configuration of Pro-Active Operations, Administration, and Maintenance (OAM) Functions for MPLS-based Transport Networks using LSP Ping", MPLS Working Group, Oct. 31, 2011, pp. 1-21.
PCT International Search Report dated Oct. 10, 2013 in corresponding International Patent Application No. PCT/CN2013/077982.
International Search Report dated Oct. 10, 2013 in corresponding International Application No. PCT/CN2013/077982.
Chinese Office Action dated May 11, 2015 in corresponding Chinese Patent Application No. 201210223023.X.
Chinese Search Report dated Apr. 28, 2015 in corresponding Chinese Patent Application No. 201210223023X.

\* cited by examiner

METHOD, NODE, AND SYSTEM FOR DETECTING PERFORMANCE OF LAYER 3 VIRTUAL PRIVATE NETWORK

CROSS-REFERENCE TO RELATED APPLICATIONS

This application is a continuation of International Application No. PCT/CN2013/077982, filed on Jun. 26, 2013, which claims priority to Chinese Patent Application No. 201210223023.X, filed on Jun. 30, 2012, both of which are hereby incorporated by reference in their entireties.

TECHNICAL FIELD

Embodiments of the present invention relate to the field of communications network technologies, and in particular, to a method, node, and system for detecting performance of a layer 3 virtual private network.

BACKGROUND

With the rapid development of radio services over Internet Protocol, Internet Protocol (IP), an IP-based Layer 3 Virtual Private Network, layer 3 virtual private network (L3VPN) solution exhibits its obvious service advantages and is more widely applied to IP bearer networks. To better satisfy network monitoring and management, an operation, administration, and maintenance (Operation Administration and Maintenance, OAM) technology needs to be introduced in an IP bearer network. Therefore, the ITU-T developed, along with the IETF, an MPLS-TP (Transport Profile for MPLS, transport profile for MPLS) technology by extending a conventional MPLS (Multiple Protocol Label Switching, multiple protocol label switching) technology. The MPLS-TP technology mainly excludes some features of the conventional MPLS that are not applicable to transport network scenarios, and adds some new features to adapt to requirements of a transport network. For example, the MPLS-TP can provide a highly accurate OAM detection manner for an L3VPN.

In a conventional MPLS-TP based L3VPN OAM detection solution, after an OAM connection is established between a first PE (Provider Edge, provider edge) and a second PE (where at least one of the first PE and the second PE is in active mode, and the PE in active mode sends an OAM connection request to the other PE), OAM configuration information is negotiated based on an OAM protocol, and only when OAM configurations of the first PE and the second PE match each other, OAM detection can be performed by receiving and sending OAM packets.

In the foregoing solution, OAM configuration needs to be performed manually for the first PE and the second PE. In this static configuration manner, same OAM configuration is performed on two sides, which leads to redundant operations and waste of manpower.

SUMMARY

Embodiments of the present invention provide a method, node, and system for detecting performance of a layer 3 virtual private network, which can simplify an OAM configuration procedure, improve performance detection accuracy, and save manpower.

To solve the foregoing technical problem, according to one aspect, an embodiment of the present invention provides a method for detecting performance of a layer 3 virtual private network, including:

creating an operation, administration, and maintenance instance of a first node according to operation, administration, and maintenance configuration information set by a user;

sending the operation, administration, and maintenance configuration information of the first node to a second node by using a Border Gateway Protocol packet, so that the second node creates an operation, administration, and maintenance instance of the second node according to the operation, administration, and maintenance configuration information of the first node; and performing operation, administration, and maintenance detection by sending an operation, administration, and maintenance packet to the second node and/or receiving an operation, administration, and maintenance packet from the second node, where the sending and/or receiving is implemented by using the operation, administration, and maintenance instance of the first node.

An embodiment of the present invention further provides a method for detecting performance of a layer 3 virtual private network, including:

receiving operation, administration, and maintenance configuration information from a first node by using a Border Gateway Protocol packet;

creating an operation, administration, and maintenance instance of a second node according to the received operation, administration, and maintenance configuration information of the first node; and performing operation, administration, and maintenance detection by sending an operation, administration, and maintenance packet to the first node and/or receiving an operation, administration, and maintenance packet from the first node, where the sending and/or receiving is implemented by using the operation, administration, and maintenance instance of the second node.

According to another aspect, an embodiment of the present invention further provides a node, including:

an operation, administration, and maintenance instance creating module, configured to create an operation, administration, and maintenance instance of a first node according to operation, administration, and maintenance configuration information set by a user;

an operation, administration, and maintenance configuration information sending module, configured to send the operation, administration, and maintenance configuration information of the first node to a second node by using a Border Gateway Protocol packet, so that the second node creates an operation, administration, and maintenance instance of the second node according to the operation, administration, and maintenance configuration information of the first node; and an operation, administration, and maintenance detecting module, configured to perform operation, administration, and maintenance detection by sending an operation, administration, and maintenance packet to the second node and/or receiving an operation, administration, and maintenance packet from the second node, wherein the sending and/or receiving is implemented by using the operation, administration, and maintenance instance of the first node.

An embodiment of the present invention further provides another node, including:

an operation, administration, and maintenance configuration information receiving module, configured to receive operation, administration, and maintenance configuration information from a first node by using a Border Gateway Protocol packet;

an operation, administration, and maintenance instance creating module, configured to create an operation, administration, and maintenance instance of a second node according to the operation, administration, and maintenance configuration information of the first node received by the operation, administration, and maintenance configuration information receiving module; and an operation, administration, and maintenance detecting module, configured to perform operation, administration, and maintenance detection by sending an operation, administration, and maintenance packet to the first node and/or receiving an operation, administration, and maintenance packet from the first node, where the sending and/or receiving is implemented by using the operation, administration, and maintenance instance of the second node.

According to another aspect, an embodiment of the present invention further provides a system for detecting performance of a layer 3 virtual private network, where the system includes a first node and a second node, where the first node is configured to create an operation, administration, and maintenance instance of the first node according to operation, administration, and maintenance configuration information set by a user; send the operation, administration, and maintenance configuration information of the first node to the second node by using a Border Gateway Protocol packet, so that the second node creates an operation, administration, and maintenance instance of the second node according to the operation, administration, and maintenance configuration information of the first node; and perform operation, administration, and maintenance detection by sending an operation, administration, and maintenance packet to the second node and/or receiving an operation, administration, and maintenance packet from the second node, where the sending and/or receiving is implemented by using the operation, administration, and maintenance instance of the first node; and the second node is configured to receive the operation, administration, and maintenance configuration information from the first node by using the Border Gateway Protocol packet; create the operation, administration, and maintenance instance of the second node according to the received operation, administration, and maintenance configuration information of the first node; and perform operation, administration, and maintenance detection by sending the operation, administration, and maintenance packet to the first node and/or receiving the operation, administration, and maintenance packet from the first node, where the sending and/or receiving is implemented by using the operation, administration, and maintenance instance of the second node.

The embodiments of the present invention have the following beneficial effects: After receiving OAM configuration information set by a user, a first node sends the OAM configuration information to a second node, so that the second node can automatically create an OAM instance. Therefore, not only an OAM configuration procedure is simplified and manpower is saved, but also consistency of OAM configuration at two ends can be ensured. In addition, a configuration delay in this dynamic configuration manner may be ignored, a configuration sequence does not need to be strictly limited, and OAM detection accuracy can be further improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
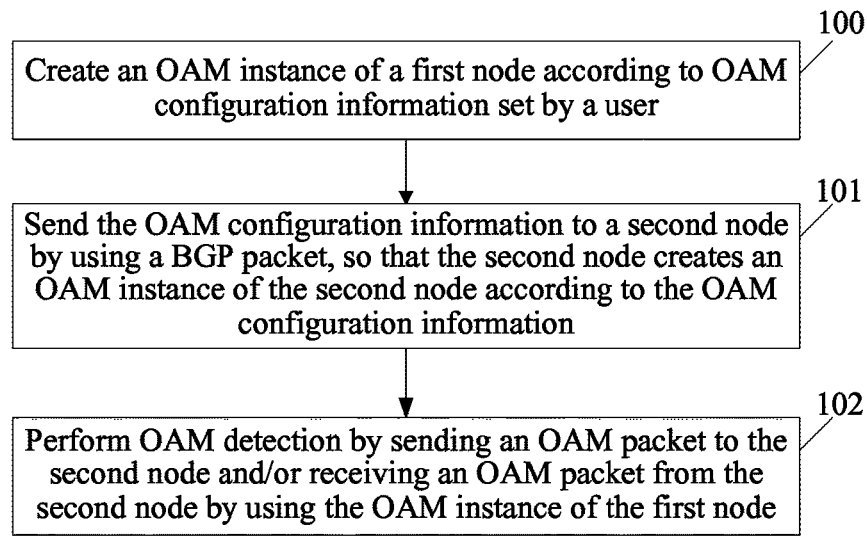
FIG. 1 is a flowchart of a first embodiment of a method for detecting performance of an L3VPN performed by a first node according to the present invention.

Referring to FIG. 1, FIG. 1 is a flowchart of a first embodiment of a method for detecting performance of an L3VPN performed by a first node according to the present invention. The method includes:

100: Create an OAM instance of a first node according to OAM configuration information set by a user. For example, the OAM configuration information includes detection function information and a detection parameter of the OAM instance. The OAM configuration information may be defined with reference to TLV (type-length-value, type-length-value) in draft-ietf-mpls-lsp-ping-mpls-tp-oam-conf-03. For example, the detection function information includes continuity check (Continuity Check, CC), connectivity verification (Connectivity Verification, CV), a fault monitoring signal (Fault Monitoring Signal, FMS), performance monitoring/loss (Performance Monitoring/Loss, PM/Loss), performance monitoring/delay (PM/Delay), performance monitoring/throughput measurement (PM/Throughput Measurement), and the like. The detection parameter may include a sending time interval of an OAM packet, an BFD (Bidirectional Forwarding Detection, bidirectional forwarding detection) identifier in an MPLS-TP based on an IETF standard, an implementation manner (for defining a related activity of the BFD) of using BFD in the MPLS-TP based on the IETF standard, and the like.

101: Send the OAM configuration information to a second node by using a BGP (Border Gateway Protocol, Border Gateway Protocol) packet, so that the second node creates an OAM instance of the second node according to the OAM configuration information. For example, multiple VPNs may be deployed on one node; at least one piece of tunnel information is encapsulated in the BGP packet, and each piece of tunnel information separately includes a VPN identifier of the first node, a VPN identifier of the second node, and OAM configuration information of a local VPN.

102: Perform OAM detection by sending an OAM packet to the second node and/or receiving an OAM packet from the second node, where the sending and/or receiving is implemented by using the OAM instance of the first node. According to a design of the MPLS-TP, an OAM and protection technology of the MPLS-TP is used for an MPLS TE (Traffic Engineering, traffic engineering) tunnel and pseudo wire emulation edge-to-edge (Pseudo Wire Emulation Edge-to-Edge, PWE3), and fault positioning and performance detection cannot be effectively performed for a service deployed by using an L3VPN. A main reason is that both the MPLS TE tunnel and the PWE3 are point-to-point, and a tunnel or a pseudo wire (Pseudo Wire, PW) can be directly recognized by using a label, thereby performing definite fault positioning or performance statistics collection; however, a label forwarding behavior of the L3VPN may be considered as a multipoint-to-point service, and a downstream node cannot effectively recognize an upstream node; therefore, it is very difficult to perform definite fault positioning and performance statistics collection. Therefore, in the foregoing 102, the OAM packet needs to carry a source label for identifying a source of the OAM packet. The source label is an added label based on an existing MPLS label stack; and because multiple VPNs may be deployed on a same node, the source label needs to identify two pieces of information, namely, a source node and a source VPN. A person skilled in the art knows well various methods for MPLS-TP OAM detection of the PW and the like that are performed by receiving and sending OAM packets, in which a node sending an OAM packet is referred to as an active OAM detection party, a node receiving an OAM packet is referred to as a passive OAM detection party, and the active OAM detection party and the passive OAM detection party may be configured by technical personnel in a static manner and may also be dynamically negotiated by nodes. An OAM detection method may include that, for example, the active OAM detection party sends an OAM packet to the passive OAM detection party; and if failing to receive the OAM packet within a preset time, the passive OAM detection party triggers an alarm. For another example, the active OAM detection party includes, in the OAM packet, the number of service packets that are sent to the passive OAM detection party within a preset time period and a sending time of an OAM packet, and sends the OAM packet to the passive OAM detection party; and according to the number of service packets that are received from the active OAM detection party within the preset time period and the number, which is included in the OAM packet, of service packets sent by the active OAM detection party, the passive OAM detection party can determine the number of lost packets in the service packets that are sent from the active OAM detection party to the passive OAM detection party. For still another example, the passive OAM detection party can further determine, according to a receiving time of the OAM packet and the sending time, included in the OAM packet, of the OAM packet, a latency of sending a service packet from the active OAM detection party to the passive OAM detection party.

In the method for detecting performance of an L3VPN, after OAM configuration information set by a user is received, the OAM configuration information is sent to a second node, so that the second node can automatically create an OAM instance. Therefore, not only an OAM configuration procedure is simplified and manpower is saved, but also consistency of OAM configuration at two ends can be ensured. In addition, a configuration delay in this dynamic configuration manner may be ignored, a configuration sequence does not need to be strictly limited, and OAM detection accuracy can be further improved.

Figure 2:
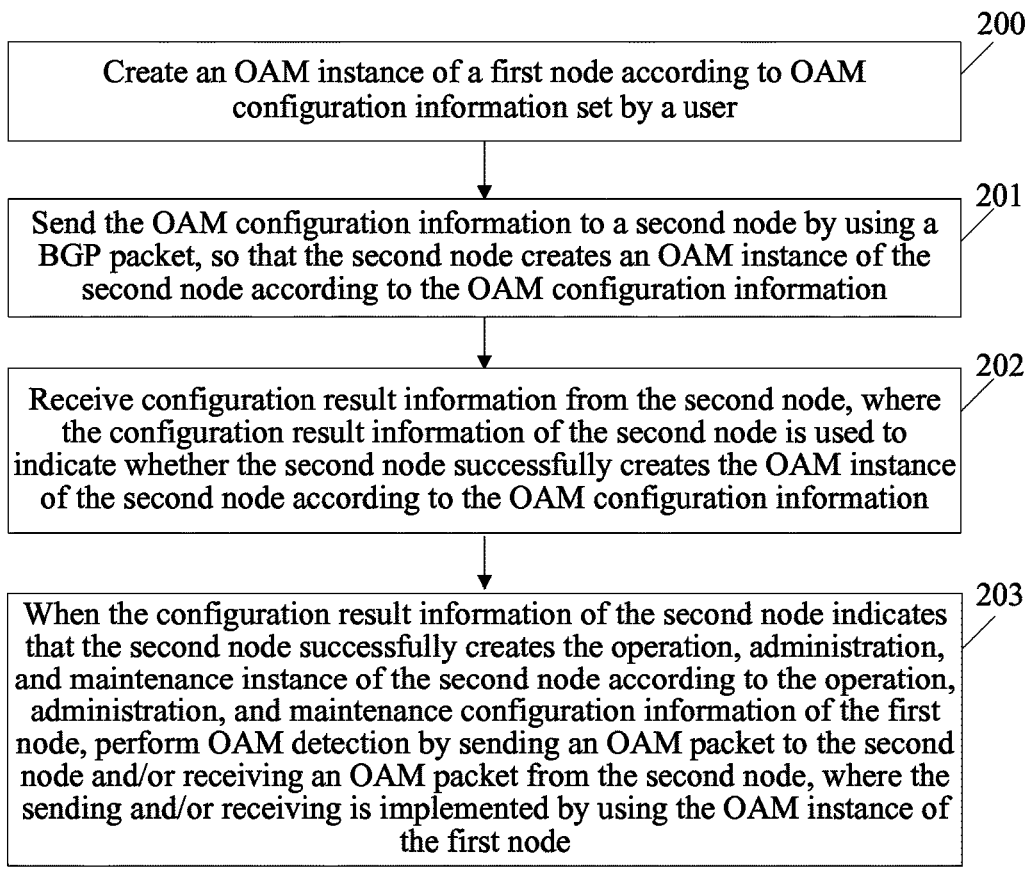
FIG. 2 is a flowchart of a second embodiment of a method for detecting performance of an L3VPN performed by a first node according to the present invention.

Referring to FIG. 2, FIG. 2 is a flowchart of a second embodiment of a method for detecting performance of an L3VPN performed by a first node according to the present invention. The method includes:

200: Create an OAM instance of a first node according to OAM configuration information set by a user.

201: Send the OAM configuration information to a second node by using a BGP packet, so that the second node creates an OAM instance of the second node according to the OAM configuration information.

202: Receive configuration result information from the second node, where the configuration result information of the second node is used to indicate whether the second node successfully creates the second OAM instance of the second node according to the OAM configuration information. Because the second node may not have an OAM function and therefore cannot create the OAM instance of the second node, to avoid that when the first node is an active OAM detection party, the first node keeps sending an OAM packet for OAM detection to the second node, or to avoid that when the first node is a passive OAM detection party, the first node triggers a false alarm because of failure to receive an OAM packet, the second node returns the configuration result information to the first node to notify the first node of a result of creating the OAM instance of the second node, so that the first node normally performs OAM detection when the configuration result information indicates that creation is successful, and ends the OAM detection when the configuration result information indicates that creation fails.

203: When the configuration result information of the second node indicates that the second node successfully creates the operation, administration, and maintenance instance of the second node according to the operation, administration, and maintenance configuration information of the first node, perform OAM detection by sending an OAM packet to the second node and/or receiving an OAM packet from the second node, where the sending and/or receiving is implemented by using the OAM instance of the first node.

Figure 3:
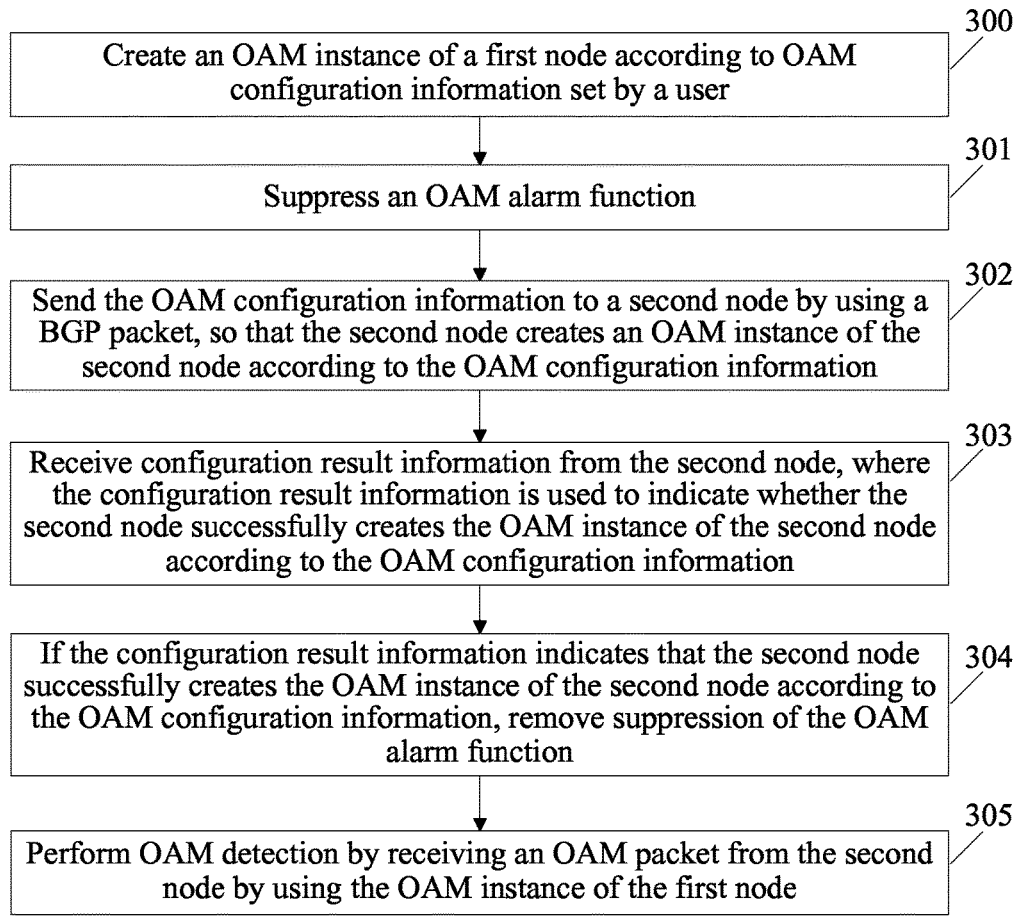
FIG. 3 is a flowchart of a third embodiment of a method for detecting performance of an L3VPN performed by a first node according to the present invention.

Referring to FIG. 3, FIG. 3 is a flowchart of a third embodiment of a method for detecting performance of an L3 VPN performed by a first node according to the present invention.

The method includes:

300: Create an OAM instance of a first node according to OAM configuration information set by a user.

301: Suppress an OAM alarm function.

302: Send the OAM configuration information to a second node by using a BGP packet, so that the second node creates an OAM instance of the second node according to the OAM configuration information.

303: Receive configuration result information from the second node, where the configuration result information is used to indicate whether the second node successfully creates the OAM instance of the second node according to the OAM configuration information.

304: If the configuration result information indicates that the second node successfully creates the OAM instance of the second node according to the OAM configuration information, remove suppression of the OAM alarm function.

305: Perform OAM detection by receiving an OAM packet from the second node by using the OAM instance of the first node.

In this embodiment, a first node is a passive OAM detection party and a second node is an active OAM detection party; the first node first suppresses an OAM alarm function of the first node before sending OAM configuration information to the second node, so as to avoid a false alarm of an OAM instance of the first node caused by failed creation of an OAM instance of the second node; and the first node removes suppression of the OAM alarm function after receiving a message indicating successful creation of the OAM instance of the second node, and immediately performs OAM detection normally, so as to avoid a leakage alarm of the OAM instance of the first node caused by suppression of the alarm function. In this manner, OAM detection accuracy can be further improved, thereby improving communication quality.

Figure 4:
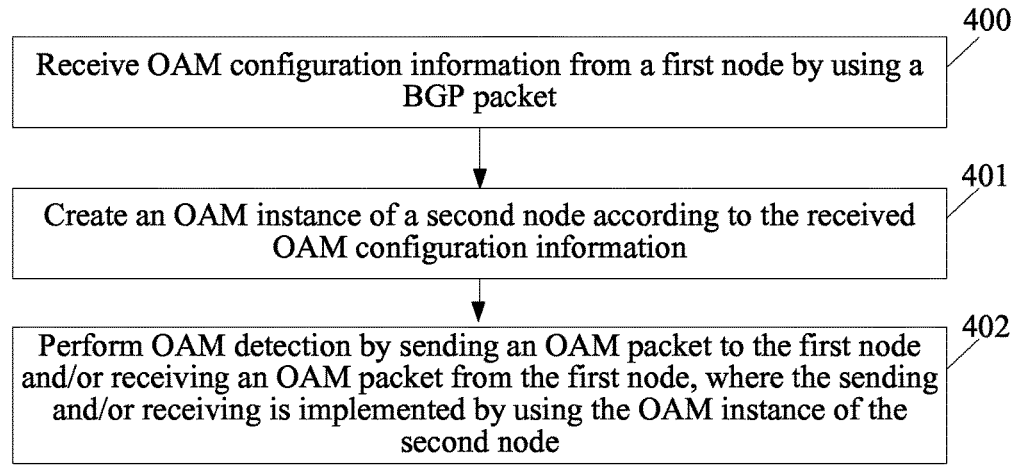
FIG. 4 is a flowchart of a first embodiment of a method for detecting performance of an L3VPN performed by a second node according to the present invention.

Referring to FIG. 4, FIG. 4 is a flowchart of a first embodiment of a method for detecting performance of an L3VPN performed by a second node according to the present invention. Corresponding to FIG. 1, the method includes:

400: Receive OAM configuration information from a first node by using a BGP packet.

401: Create an OAM instance of a second node according to the received OAM configuration information.

402: Perform OAM detection by sending an OAM packet to the first node and/or receiving an OAM packet from the first node, where the sending and/or receiving is implemented by using the OAM instance of the second node.

In the method for detecting performance of an L3VPN provided in the embodiment of the present invention, after OAM configuration information is received from a first node, an OAM instance of a second node is automatically created according to the OAM configuration information. Therefore, not only an OAM configuration procedure is simplified and manpower is saved, but also consistency of OAM configuration at two ends can be ensured. In addition, a configuration delay in this dynamic configuration manner may be ignored, a configuration sequence does not need to be strictly limited, and OAM detection accuracy can be further improved.

Figure 5:
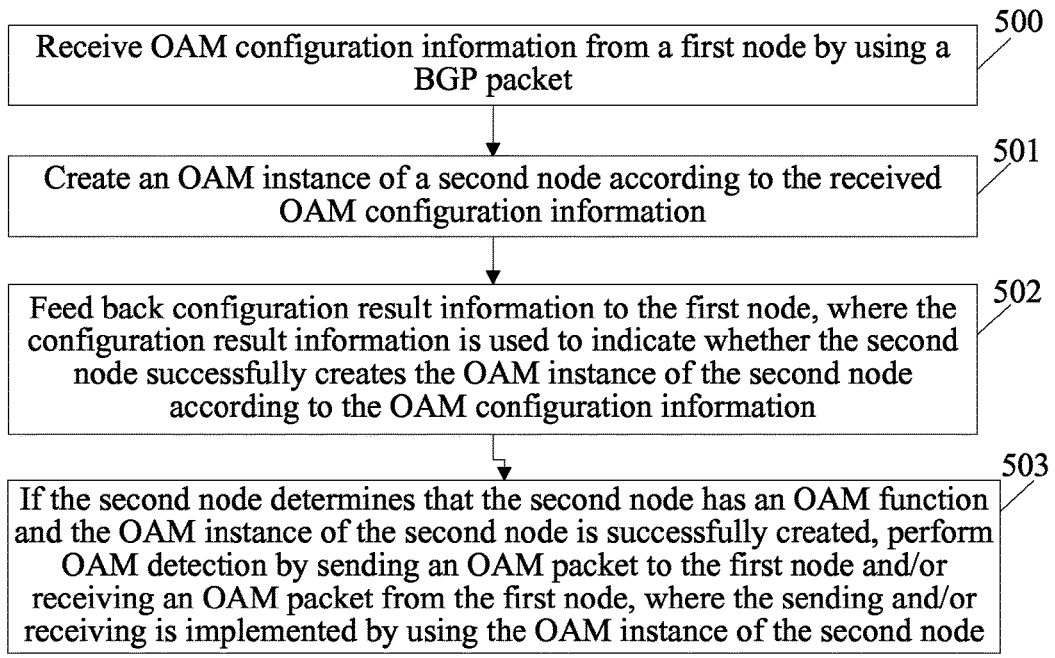
FIG. 5 is a flowchart of a second embodiment of a method for detecting performance of an L3VPN performed by a second node according to the present invention.

Referring to FIG. 5, FIG. 5 is a flowchart of a second embodiment of a method for detecting performance of an L3VPN performed by a second node according to the present invention. Corresponding to FIG. 2, the method includes:

500: Receive OAM configuration information from a first node by using a BGP packet.

501: Create an OAM instance of a second node according to the received OAM configuration information.

For example, the second node first determines whether the second node has an OAM function; if the second node has the OAM function, the second node creates the OAM instance of the second node according to the received OAM configuration information and performs 502 to feed back configuration result information used for indicating successful creation to the first node; and if the second node does not have the OAM function, the second node directly performs 502 to feed back configuration result information used for indicating failed creation to the first node.

502: Feedback configuration result information to the first node, where the configuration result information is used to indicate whether the second node successfully creates the OAM instance of the second node according to the OAM configuration information.

503: If the second node determines that the second node has an OAM function and the OAM instance of the second node is successfully created, perform OAM detection by sending an OAM packet to the first node and/or receiving an OAM packet from the first node, where the sending and/or receiving is implemented by using the OAM instance of the second node.

Figure 6:
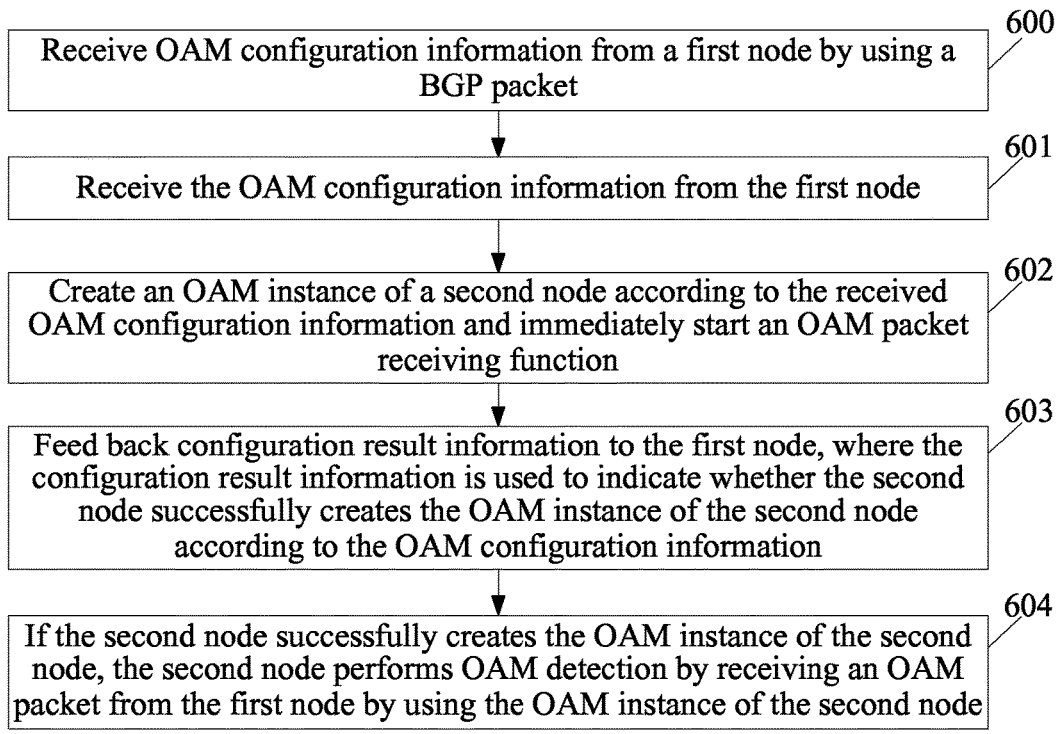
FIG. 6 is a flowchart of a third embodiment of a method for detecting performance of an L3VPN performed by a second node according to the present invention.

Referring to FIG. 6, FIG. 6 is a flowchart of a third embodiment of a method for detecting performance of an L3VPN performed by a second node according to the present invention. The method includes:

600: Receive OAM configuration information from a first node by using a BGP packet.

601: Receive the OAM configuration information from the first node.

602: Create an OAM instance of a second node according to the received OAM configuration information and immediately start an OAM packet receiving function.

603: Feedback configuration result information to the first node, where the configuration result information is used to indicate whether the second node successfully creates the OAM instance of the second node according to the OAM configuration information.

604: If the second node successfully creates the OAM instance of the second node, the second node performs OAM detection by receiving an OAM packet from the first node by using the OAM instance of the second node.

In the embodiment shown in FIG. 6, the first node is an active OAM detection party and the second node is a passive OAM detection party, and the second node immediately starts the OAM packet receiving function of the second node after receiving the OAM configuration information, so as to avoid a false alarm caused by missing an OAM packet from the first node. In this manner, OAM detection accuracy can be further improved, thereby improving communication quality.

FIG. 3 and FIG. 6 respectively show two unidirectional detection scenarios, namely, a scenario in which the second node is an active OAM detection party, and a scenario in which the first node is an active OAM detection party. Besides, bidirectional detection can be further performed between the first node and the second node, that is, the first node and the second node send an OAM packet to each other. In an embodiment of bidirectional detection, before sending OAM configuration information to the second node, the first node suppresses an OAM alarm function; after receiving configuration result information from the second node, if the configuration result information indicates that the second node successfully creates an OAM instance of the second node, the first node removes suppression of the OAM alarm function; and the second node immediately starts an OAM packet receiving function after receiving the OAM configuration information from the first node.

In addition, although all the embodiments shown in FIG. 1 to FIG. 6 only involve creation of an OAM instance, to which it is not limited in the present invention. For example, when OAM detection no longer needs to be performed, technical personnel may delete the OAM instance of the first node, and in this case, the first node may also send a deletion information to the second node by using a BGP packet, so that the second node automatically deletes the OAM instance of the second node, of which a process is similar to the foregoing process of dynamically creating an OAM instance, and is not repeatedly described in detail. For another example, when the OAM configuration information needs to be modified, a VPN of the first node receives modified OAM configuration information set by a user, and sends the modified OAM configuration information to the second node by using a BGP packet, so that the second node recreates a new OAM instance, of which a process is similar to the foregoing process of dynamically creating an OAM instance, and is not repeatedly described in detail.

Figure 7:
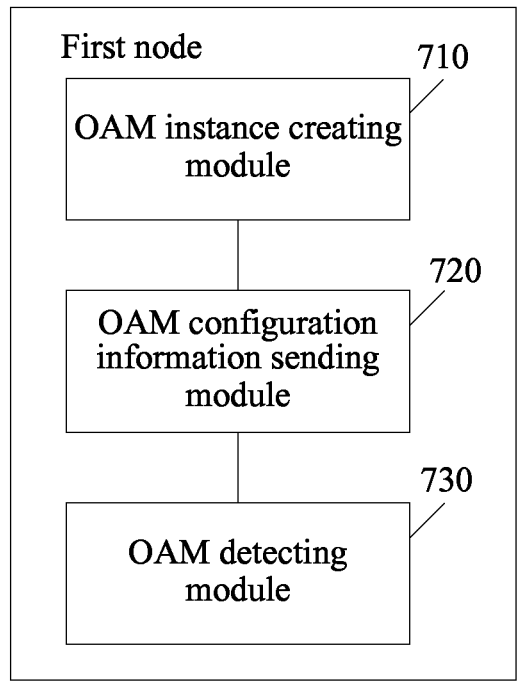
FIG. 7 is a schematic composition diagram of a first embodiment of a first node according to the present invention.

Referring to FIG. 7, FIG. 7 is a schematic composition diagram of a first embodiment of a first node according to the present invention. The first node includes:

an OAM instance creating module 710, configured to create an OAM instance of the first node according to OAM configuration information set by a user;

an OAM configuration information sending module 720, configured to send the OAM configuration information to a second node by using a BGP packet, so that the second node creates an OAM instance of the second node according to the OAM configuration information; and an OAM detecting module 730, configured to perform OAM detection by sending an OAM packet to the second node and/or receiving an OAM packet from the second node, where the sending and/or receiving is implemented by using the OAM instance of the first node.

In the first node provided in the embodiment of the present invention, after OAM configuration information set by a user is received, the OAM configuration information is sent to a second node, so that the second node can automatically create an OAM instance. Therefore, not only an OAM configuration procedure is simplified and manpower is saved, but also consistency of OAM configuration at two ends can be ensured. In addition, a configuration delay in this dynamic configuration manner may be ignored, a configuration sequence does not need to be strictly limited, and OAM detection accuracy can be further improved.

Figure 8:
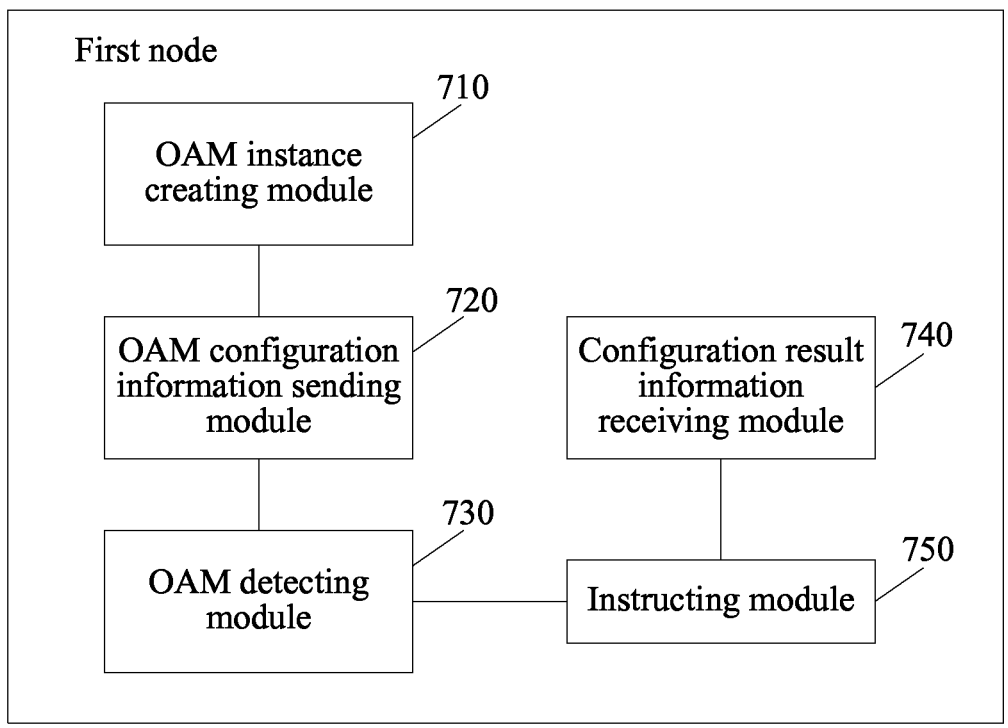
FIG. 8 is a schematic composition diagram of a second embodiment of a first node according to the present invention.

Referring to FIG. 8, FIG. 8 is a schematic composition diagram of a second embodiment of a first node according to the present invention. The first node in this embodiment includes an OAM instance creating module 710, an OAM configuration information sending module 720, an OAM detecting module 730, a configuration result information receiving module 740, and an instructing module 750.

Functions of the OAM instance creating module 710, the OAM configuration information sending module 720, and the OAM detecting module 730 in this embodiment are the same as those in the first embodiment of the first node, and are not described in detail herein.

The configuration result information receiving module 740 is configured to receive configuration result information from a second node, where the configuration result information is used to indicate whether the second node successfully creates an OAM instance of the second node according to OAM configuration information.

The instructing module 750 is configured to: when the configuration result information of the second node received by the configuration result information receiving module 740 indicates that the second node successfully creates the operation, administration, and maintenance instance of the second node according to the operation, administration, and maintenance configuration information of the first node, instruct the operation, administration, and maintenance detecting module 730 to perform operation, administration, and maintenance detection by sending an operation, administration, and maintenance packet to the second node and/or receiving an operation, administration, and maintenance packet from the second node, where the sending and/or receiving is implemented by using the operation, administration, and maintenance instance of the first node.

Figure 9:
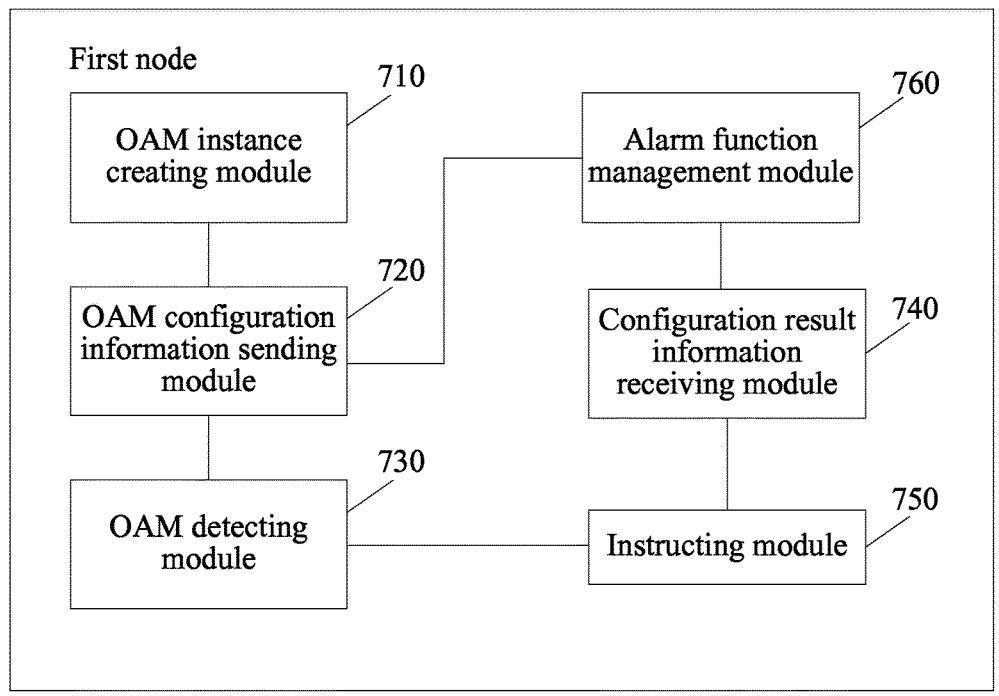
FIG. 9 is a schematic composition diagram of a third embodiment of a first node according to the present invention.

Referring to FIG. 9, FIG. 9 is a schematic composition diagram of a third embodiment of a first node according to the present invention. A difference between the first node in this embodiment and the second embodiment of the first node of the present invention lies in that an alarm function management module 760 is added. The alarm function management module 760 is configured to: before the operation, administration, and maintenance configuration information sending module 720 sends the operation, administration, and maintenance configuration information of the first node to the second node by using the Border Gateway Protocol packet, suppress an operation, administration, and maintenance alarm function of the first node; and after the configuration result information receiving module 740 receives the configuration result information from the second node, if the configuration result information of the second node indicates that the second node successfully creates the operation, administration, and maintenance instance of the second node according to operation, administration, and maintenance instance configuration information of the first node, remove suppression of the operation, administration, and maintenance alarm function.

In this embodiment, the first node is a passive OAM detection party and the second node is an active OAM detection party; the first node first suppresses an OAM alarm function of the first node before sending OAM configuration information to the second node, so as to avoid a false alarm of an OAM instance of the first node caused by failed creation of an OAM instance of the second node; and the first node removes suppression of the OAM alarm function after receiving a message indicating successful creation of the OAM instance of the second node, and immediately performs OAM detection normally, so as to avoid a leakage alarm of the OAM instance of the first node caused by suppression of the alarm function. In this manner, OAM detection accuracy can be further improved, thereby improving communication quality.

Figure 10:
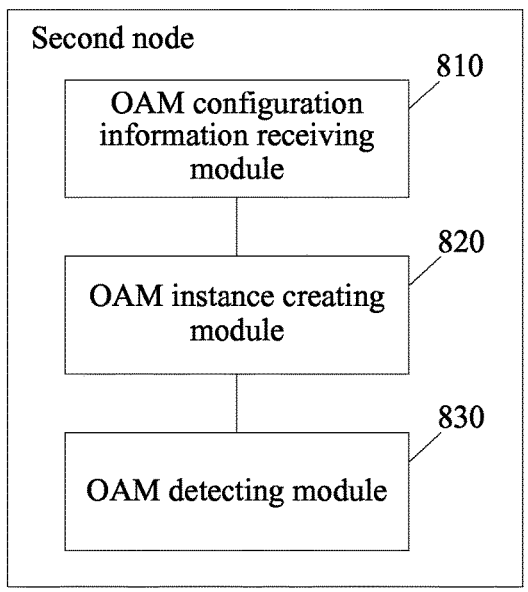
FIG. 10 is a schematic composition diagram of a first embodiment of a second node according to the present invention.

Referring to FIG. 10, FIG. 10 is a schematic composition diagram of a first embodiment of a second node according to the present invention. The second node includes:

an OAM configuration information receiving module 810, configured to receive OAM configuration information from a first node by using a BGP packet;

an OAM instance creating module 820, configured to create an OAM instance of the second node according to the OAM configuration information received by the OAM configuration information receiving module 810; and an OAM detecting module 830, configured to perform OAM detection by sending an OAM packet to the first node and/or receiving an OAM packet from the first node, where the sending and/or receiving is implemented by using the OAM instance of the second node created by the OAM instance creating module 820.

In the second node provided in the embodiment of the present invention, after OAM configuration information from a first node is received, an OAM instance of the second node is automatically created according to the OAM configuration information. Therefore, not only an OAM configuration procedure is simplified and manpower is saved, but also consistency of OAM configuration at two ends can be ensured. In addition, a configuration delay in this dynamic configuration manner may be ignored, a configuration sequence does not need to be strictly limited, and OAM detection accuracy can be further improved.

Figure 11:
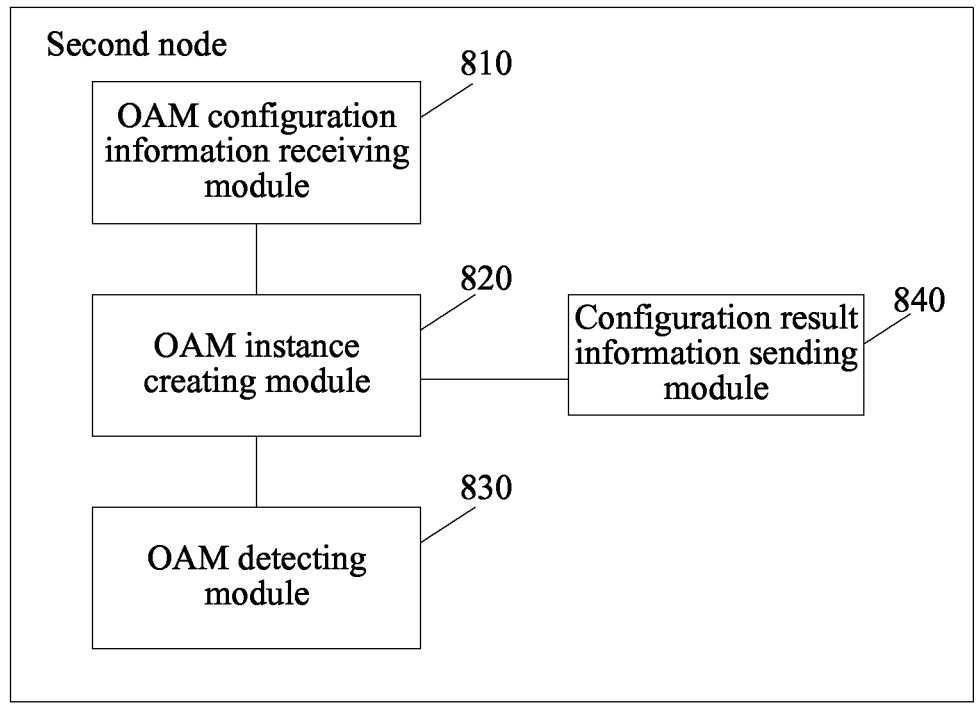
FIG. 11 is a schematic composition diagram of a second embodiment of a second node according to the present invention.

Referring to FIG. 11, FIG. 11 is a schematic composition diagram of a second embodiment of a second node according to the present invention. A difference between the second node in this embodiment and the first embodiment of the second node of the present invention lies in that a configuration result information sending module 840 is added. The configuration result information sending module 840 is configured to: after the OAM instance creating module 820 creates the operation, administration, and maintenance instance of the second node according to the operation, administration, and maintenance configuration information of the first node received by the OAM configuration information receiving module 810, send configuration result information of the second node to the first node, where the configuration result information of the second node is used to indicate whether the second node successfully creates the operation, administration, and maintenance instance of the second node according to the operation, administration, and maintenance configuration information of the first node.

In addition, although all the embodiments shown in FIG. 7 to FIG. 11 only involve creation of an OAM instance, to which it is not limited in the present invention. For example, when OAM detection no longer needs to be performed, technical personnel may delete the OAM instance of the first node, and in this case, the first node may also send the deletion information to the second node by using a BGP packet, so that the second node automatically deletes the OAM instance of the second node, of which a process is similar to the foregoing process of dynamically creating an OAM instance, and is not repeatedly described in detail. For another example, when the OAM configuration information needs to be modified, the first node receives modified OAM configuration information set by a user, and sends the modified OAM configuration information to the second node by using a BGP packet, so that the second node recreates a new OAM instance, of which a process is similar to the foregoing process of dynamically creating an OAM instance, and is not repeatedly described in detail.

Figure 12:
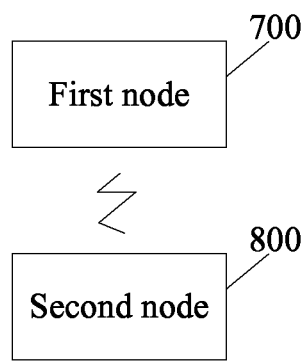
FIG. 12 is a schematic composition diagram of a system for detecting performance of an L3VPN according to the present invention.

Referring to FIG. 12, FIG. 12 is a schematic composition diagram of a system for detecting performance of an L3VPN according to the present invention. The system includes a first node 700 and a second node 800.

The first node 700 is configured to create an operation, administration, and maintenance instance of the first node according to operation, administration, and maintenance configuration information set by a user; send the operation, administration, and maintenance configuration information of the first node 700 to the second node 800 by using a Border Gateway Protocol packet, so that the second node 800 creates an operation, administration, and maintenance instance of the second node 800 according to the operation, administration, and maintenance configuration information of the first node 700; and perform operation, administration, and maintenance detection by sending an operation, administration, and maintenance packet to the second node 800 and/or receiving an operation, administration, and maintenance packet from the second node 800, where the sending and/or receiving is implemented by using the operation, administration, and maintenance instance of the first node 700.

The second node 800 is configured to receive the operation, administration, and maintenance configuration information from the first node 700 by using a Border Gateway Protocol packet; create the operation, administration, and maintenance instance of the second node 800 according to the received operation, administration, and maintenance configuration information of the first node 700; and perform operation, administration, and maintenance detection by sending an operation, administration, and maintenance packet to the first node 700 and/or receiving an operation, administration, and maintenance packet from the first node 700, where the sending and/or receiving is implemented by using the operation, administration, and maintenance instance of the second node 800.

Specific structures of the first node 700 and the second node 800 are already described in detail with reference to FIG. 7 to FIG. 9, and FIG. 10 to FIG. 11, respectively, and details are not repeatedly described herein.

For example, both the first node 700 and the second node 800 may be provider edges (Provider Edge, PE), for example, routers or switches. In this specification, when a PE creates an OAM instance by using OAM configuration information directly set by a user, the PE is referred to as the first node 700; and when a PE creates an OAM instance by using OAM configuration information received from the first node 700, the PE is referred to as the second node 800. As set by a user or as dynamically negotiated between the first node 700 and the second node 800, unidirectional OAM detection may be performed between the first node 700 and the second node 800, that is, the first node 700 serves as an active OAM detection party or the second node 800 serves as an active OAM detection party; and bidirectional OAM detection may further be performed between the first node 700 and the second node 800, that is, the first node 700 and the second node 800 send an OAM packet to each other to perform OAM detection.

In addition, multiple VPNs may be deployed on one PE; therefore, when the first node 700 sends OAM configuration information to the second node 800 by using a BGP packet, a VPN, of the first node 700, corresponding to the OAM configuration information, is referred to as a VPN of the first node, and a VPN, of the second node 800, corresponding to the OAM configuration information, is referred to as a VPN of the second node. A BGP packet may include at least one piece of tunnel information, and each piece of tunnel information separately includes a VPN identifier of the first node, a VPN identifier of the second node, and the OAM configuration information of the VPN of the first node. From a VPN identifier 1 of a first node to a VPN identifier M of the first node, and from a VPN identifier 1 of the second node to a VPN identifier N of the second node, the BGP packet may include M*N pieces of tunnel information.

In the system for detecting performance of an L3VPN provided in the embodiment of the present invention, after receiving OAM configuration information set by a user, a first node sends the OAM configuration information to a second node, so that the second node can automatically create an OAM instance. Therefore, not only an OAM configuration procedure is simplified and manpower is saved, but also consistency of OAM configuration at two ends can be ensured. In addition, a configuration delay in this dynamic configuration manner may be ignored, a configuration sequence does not need to be strictly limited, and OAM detection accuracy can be further improved.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

Those disclosed above are merely exemplary embodiments of the present invention, but definitely are not intended to limit the protection scope of the present invention. A person skilled in the art can understand all or a part of processes that implement the foregoing embodiments and equivalent modifications made in accordance with the claims of the present invention shall fall within the scope of the present invention.

What is claimed is:

1. A method for detecting performance of a layer 3 virtual private network, comprising:
   creating, by a first node, an operation, administration, and maintenance (OAM) instance of the first node according to OAM configuration information set by a user;
   suppressing an OAM alarm function of the first node to avoid a false alarm of the created OAM instance of the first node caused by a failed creation of an OAM instance of a second node;
   after suppressing the OAM alarm function of the first node, sending, by the first node, the OAM configuration information of the first node to the second node by using a Border Gateway Protocol packet, wherein the second node creates an OAM instance of the second node in response to receiving the OAM configuration information of the first node;
   receiving, by the first node, configuration result information from the second node, wherein the configuration result information of the second node is used to indicate whether the second node successfully creates the OAM instance of the second node in response to receiving the OAM configuration information of the first node; and
   when the configuration result information of the second node indicates that the second node successfully creates the OAM instance of the second node in response to receiving the OAM configuration information of the first node, removing, by the first node, suppression of the OAM alarm function to avoid a leakage alarm of the OAM instance of the first node caused by suppression of the OAM alarm function, and performing, by the first node, OAM detection by sending an OAM packet to the second node and/or receiving an OAM packet from the second node, wherein the sending and/or receiving is implemented by using the OAM instance of the first node.

2. The method according to claim 1, wherein at least one piece of tunnel information is encapsulated in the Border Gateway Protocol packet, and each piece of tunnel information separately comprises a virtual private network identifier of the first node, a virtual private network identifier of the second node, and OAM configuration information of a virtual private network of the first node.

3. A first node, comprising:
   a computer readable storage medium configured to store a program to be executed by the first node, the program comprises instructions to:
   create an operation, administration, and maintenance (OAM) instance of the first node according to OAM configuration information set by a user;
   suppress an OAM alarm function of the first node to avoid a false alarm of the created OAM instance of the first node caused by a failed creation of an OAM instance of a second node;
   after suppressing the OAM alarm function of the first node, send the OAM configuration information of the first node to the second node by using a Border Gateway Protocol packet, wherein the second node creates an OAM instance of the second node in response to receiving the OAM configuration information of the first node;
   receive configuration result information from the second node, wherein the configuration result information of the second node is used to indicate whether the second node successfully creates the OAM instance of the second node in response to receiving the OAM configuration information of the first node; and
   when the configuration result information of the second node indicates that the second node successfully creates the OAM instance of the second node in response to receiving the OAM configuration information of the first node, remove suppression of the OAM alarm function to avoid a leakage alarm of the OAM instance of the first node caused by suppression of the OAM alarm function, and perform OAM-detection by sending an OAM packet to the second node and/or receiving an OAM packet from the second node, wherein the sending and/or receiving is implemented by using the OAM instance of the first node.

4. A system for detecting performance of a layer 3 virtual private network, wherein the system comprises a first node and a second node, wherein
   the first node is configured to create an operation, administration, and maintenance (OAM) instance of the first node according to OAM configuration information set by a user; suppress an OAM alarm function of the first node to avoid a false alarm of the created OAM instance of the first node caused by a failed creation of an OAM instance of the second node; after suppressing the OAM alarm function of the first node, send the OAM configuration information of the first node to the second node by using a Border Gateway Protocol packet, wherein the second node creates an OAM instance of the second node in response to receiving the OAM configuration information of the first node; receive configuration result information from the second node, wherein the configuration result information of the second node is used to indicate whether the second node successfully creates the OAM instance of the second node in response to receiving the OAM configuration information of the first node; and when the configuration result information of the second node indicates that the second node successfully creates the OAM instance of the second node in response to receiving the OAM configuration information of the first node, remove suppression of the OAM alarm function to avoid a leakage alarm of the OAM instance of the first node caused by suppression of the OAM alarm function, and perform OAM detection by sending an OAM packet to the second node and/or receiving an OAM packet from the second node, wherein the sending and/or receiving is implemented by using the OAM instance of the first node; and the second node is configured to receive the OAM configuration information from the first node by using the Border Gateway Protocol packet; create the OAM instance of the second node in response to receiving the OAM configuration information of the first node; send the configuration result information of the second node to the first node, wherein the configuration result information of the second node is used to indicate whether the second node successfully creates the OAM instance of the second node in response to receiving the OAM configuration information of the first node; and perform OAM detection by sending the OAM packet to the first node and/or receiving the OAM packet from the first node, wherein the sending and/or receiving is implemented by using the OAM instance of the second node.

* * * * *